W. R. DUNKEL.
AUTOMOBILE PRIMER.
APPLICATION FILED DEC. 13, 1910.
1,021,765.
Patented Apr. 2, 1912.
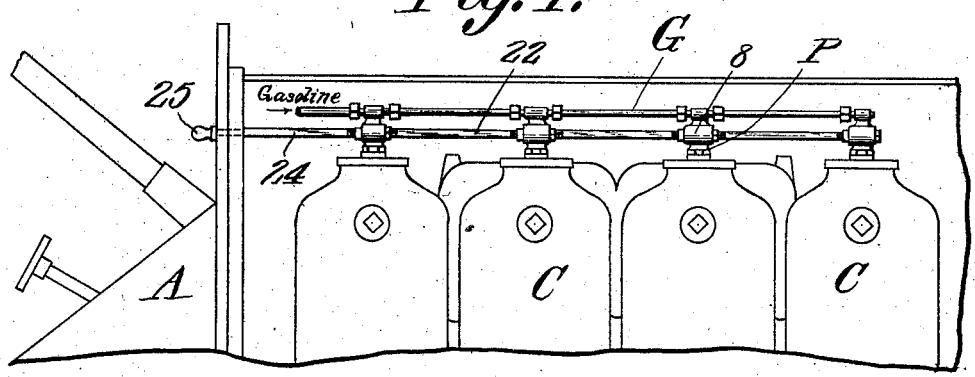
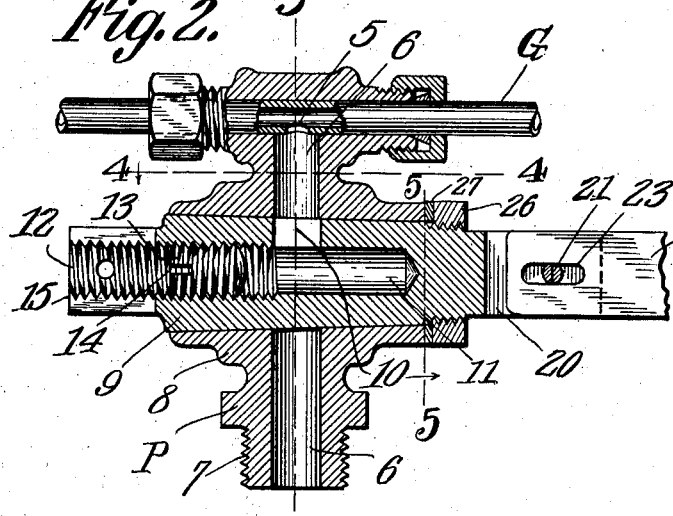
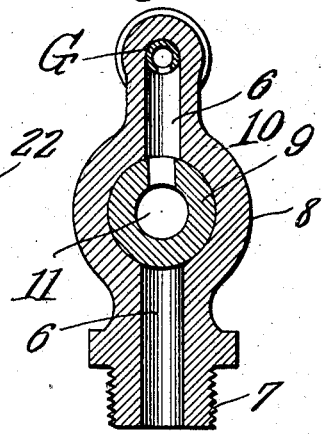
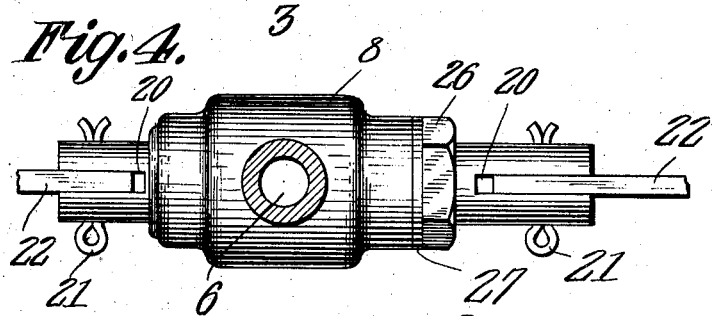
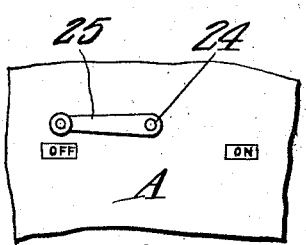
Witnesses
Wilber R. Dunkel
Inventor,
by C. A. Snow & Co.
Attorneys.

UNITED STATES PATENT OFFICE.

WILBER R. DUNKEL, OF PANA, ILLINOIS, ASSIGNOR OF ONE-HALF TO CARTER R. SCROGGIN, OF HARRISTOWN, ILLINOIS.

AUTOMOBILE-PRIMER.

1,021,765. Specification of Letters Patent. Patented Apr. 2, 1912.

Application filed December 13, 1910. Serial No. 597,110.

*To all whom it may concern:*

Be it known that I, WILBER R. DUNKEL, a citizen of the United States, residing at Pana, in the county of Christian and State of Illinois, have invented a new and useful Automobile-Primer, of which the following is a specification.

This invention relates to internal combustion engines, and more especially to the starting devices thereof which apply a combustible mixture to the cylinders; and the object of the same is to produce a primer by means of which all the cylinders can be instantaneously primed with raw or free gasolene in charges which can be adjusted according to the requirements of each cylinder.

To this end the invention consists in the construction hereinafter set forth and claimed, and as shown in the drawings wherein—

Figure 1 is a side elevation of the engine of an automobile with my improved primer attached; Fig. 2 is an enlarged section through one of the measuring valves, and its parts; Fig. 3 is a vertical section on the line 3—3 of Fig. 2; Fig. 4 is a horizontal section on the line 4—4 of Fig. 2; Fig. 5 is a section on the line 5—5 of Fig. 2; Fig. 6 is a detail of the switch attached to the dashboard.

In the drawings is shown part of an automobile A, having four cylinders C, and G designates a pipe for conveying gasolene to the pet cocks P which are now commonly inserted in the upper ends of the cylinders for priming purposes.

Coming now more particularly to the present invention, the gasolene pipe G leads over the various pet cocks which stand in a row and is connected with each of them through an inlet port 5 and other means best seen in Fig. 2, and the bore 6 of each pet cock leads down through its screw threaded lower end 7 which engages in and through the wall of the cylinder in a manner well understood. The body of this pet cock forms the casing 8 of a measuring valve whose plug 9 is tapered externally as shown and has a transverse opening or bore 10 adapted to register with the bore 6 within the pet cock. Said plug also has a longitudinal bore 11 communicating with the transverse bore 10 and thus forming a T-shaped measuring chamber within the plug, one end of the bore 11 being internally threaded as at 12 to receive a threaded plug 13 having a nick 14 in its outer end which may be reached with a fine screw driver through the open end 15 of the plug 9. Obviously when this plug is adjusted forward or backward the size of the measuring chamber within the plug may be regulated as desired. In Fig. 2 the bore 10 which forms the shank of this T-shaped chamber stands uppermost ready to receive gasolene through the inlet port 5 from the tube G, and it is obvious that when the plug is given a half revolution by means of the switch illustrated in Fig. 6 the bore 10 will be moved from the inlet around to the outlet portion of the bore 6 and the charge of gasolene will be emptied into the cylinder for priming the latter. This is the construction at the head of all the cylinders of the engine.

Both extremities of the plug 9 are slotted as shown at 20 and the forks of the slots pierced with holes for split pins 21 or other fastening means whereby the various plugs are connected as by plates 22, preferably having slots 23 which loosely engage said fastening means 21. Connected with the slot of the rearmost plug is a rod 24 which passes through the dash-board and is secured to a handle 25 by turning which the operator may manipulate all of the valves at once. Around the smaller end of each plug screws a nut 26 against a washer 27 which latter is tongue-and-grooved as at 28 as shown in Fig. 5 so that it will not rotate when the nut is set up, and the adjustment of the latter is obviously for the purpose of drawing the conical plug more closely into the casing 8 when it commences to leak, the slot 23 in plate 22 permitting individual adjustment if it be found to be necessary. Moreover it is clear that the screw plugs 13 can be individually adjusted when it is found that any one cylinder needs a larger priming charge than the other. I think it hardly necessary to amplify the use of this device further than as above.

What is claimed as new is:—

1. In a primer for multi-cylinder gas engines, the combination with a row of pet cocks seated in said cylinders and each having a lateral opening intersecting its bore, and a pipe connecting the upper end of the latter with a source of gasolene supply; of a measuring valve for each pet cock consisting of a plug seated in said opening and having a T-shaped chamber whose shank registers with said bore in either of two positions, one extremity of the head of said chamber opening out the end of the plug and being internally threaded, a plug adjustable within said threaded extremity, both ends of all plugs being slotted, plates engaging the slotted ends of adjacent plugs, and means for simultaneously turning the connected series of plugs.

2. In a primer for multi-cylinder gas engines, the combination with a row of pet cocks seated in said cylinders and each having a lateral opening intersecting its bore, and a pipe connecting the upper end of the latter with a source of gasolene supply; of a valve for each pet cock consisting of a plug seated in said opening and having a T-shaped chamber whose shank registers with said bore in either of two positions, both ends of all plugs being slotted, plates engaging the slotted ends of adjacent plugs, connecting devices between the plates and slotted ends, and means for simultaneously turning the connected series of plugs.

3. In a primer for multi-cylinder gas engines, the combination with a row of pet cocks seated in said cylinders and each having a tapering lateral opening intersecting its bore, and a pipe connecting the upper end of the latter with a source of gasolene supply; of a measuring valve for each pet cock consisting of a tapering plug seated in said opening and having a T-shaped chamber whose shank registers with said bore in either of two positions, one extremity of the head of said chamber opening out the end of the plug and being internally threaded, a threaded plug adjustable within said threaded extremity, an adjusting nut screwed around the smaller end of said plug against the casing, both ends of each plug being recessed on their exterior, means for connecting the plugs in series, and means for simultaneously turning the connected series of plugs.

4. In a primer for multi-cylinder gas engines, the combination with a row of pet cocks seated in said cylinders and each having a tapering lateral opening intersecting its bore, and a pipe connecting the upper end of the latter with a source of gasolene supply; of a valve for each pet cock consisting of a tapering plug seated in said opening and having a T-shaped chamber whose shank registers with said bore in either of two positions; an adjusting nut screwed around the smaller end of said plug against the casing, both ends of all plugs being slotted and the arms of the slots being perforated, plates engaging the slotted ends of adjacent plugs and themselves having longitudinal slots registering with the perforations, connecting devices passing through the perforations and longitudinal slots, and means for simultaneously turning the connected series of plugs.

5. In a primer for multi-cylinder gas engines, the combination with a row of pet cocks seated in said cylinders and each having a tapering lateral opening intersecting its bore, and a pipe connecting the upper end of the latter with a source of gasolene supply; of a measuring valve for each pet cock consisting of a tapering plug seated in said opening and having a T-shaped chamber whose shank registers with said bore in either of two positions, one extremity of the head of said chamber opening out the end of the plug and being internally threaded, a threaded plug adjustable within said threaded extremity, an adjusting nut screwed around the smaller end of said plug against the casing, both ends of all plugs being slotted and the arms of the slots being perforated, plates engaging the slotted ends of adjacent plugs and themselves having longitudinal slots registering with the perforations, connecting devices passing through the perforations and longitudinal slots, and means for simultaneously turning the connected series of plugs.

In testimony that I claim the foregoing as my own, I have hereto affixed my signature in the presence of two witnesses.

WILBER R. DUNKEL.

Witnesses:
F. B. OCHSENREITER,
N. L. COLLAMER.

---

Copies of this patent may be obtained for five cents each, by addressing the "Commissioner of Patents, Washington, D. C."